Figures 1, 2:
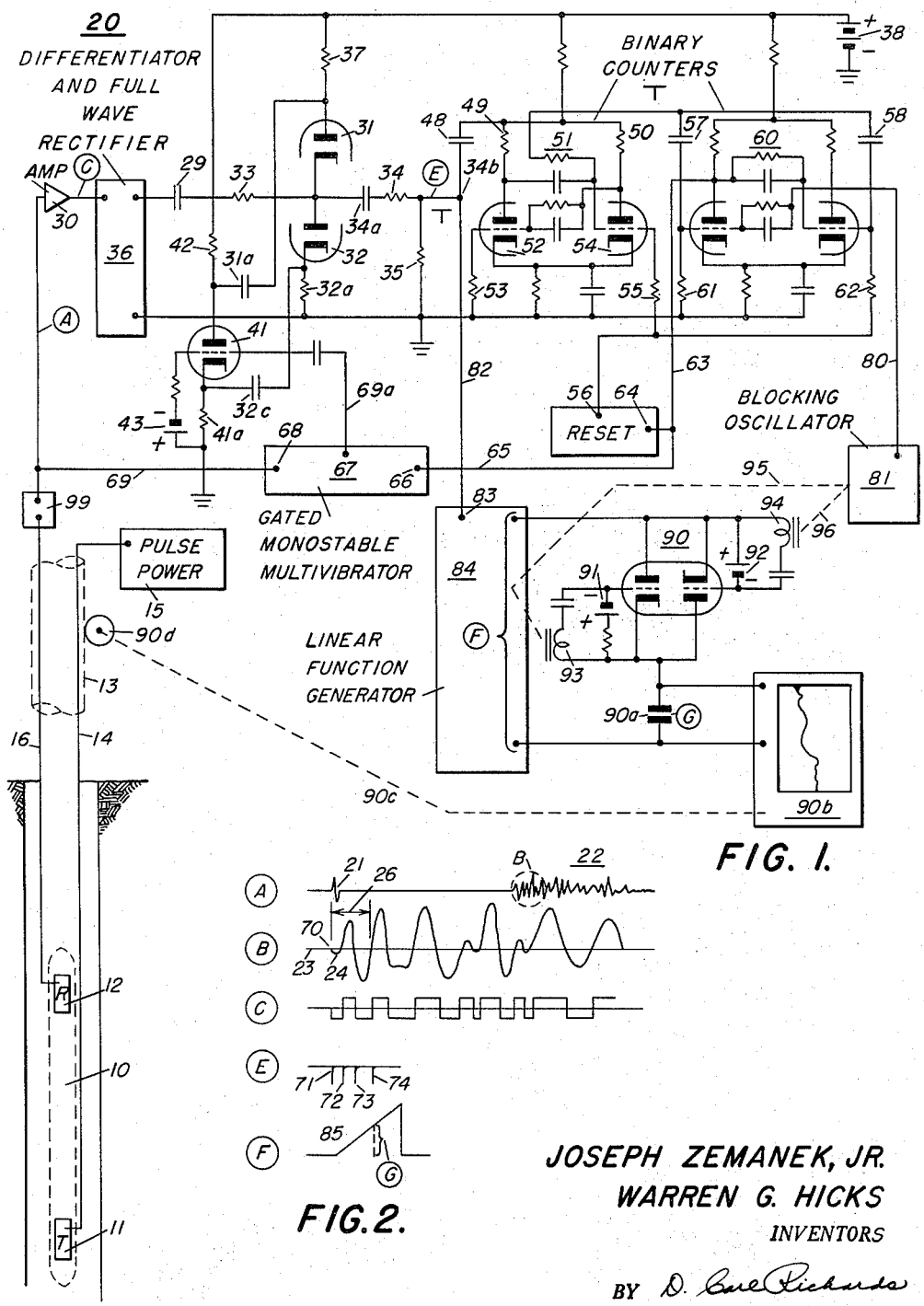

Oct. 18, 1960     J. ZEMANEK, JR., ET AL     2,956,634
SYSTEM FOR ACOUSTIC PULSE FREQUENCY LOGGING
Filed March 14, 1955

JOSEPH ZEMANEK, JR.
WARREN G. HICKS
INVENTORS

BY D. Carl Richards
ATTORNEY ns patented oct. 18, 1960

2,956,634
SYSTEM FOR ACOUSTIC PULSE FREQUENCY LOGGING

Joseph Zemanek, Jr., Dallas, and Warren G. Hicks, Grand Prairie, Tex., assignors, by mesne assignments, to Socony Mobil Oil Company, Inc., a corporation of New York Filed Mar. 14, 1955, Ser. No. 493,896

13 Claims. (Cl. 181—.5)

This invention relates to acoustic well logging and more particularly to a system for producing a log dependent upon frequency selective modification of acoustic energy traveling through earth formations.

It has been found that the frequency of an acoustic signal resulting from generation of transient acoustic pulses is somewhat dependent upon the character of the surrounding formations. For example in acoustic well logging systems employing a transmitter and a receiver spaced about ten borehole diameters, more or less, along a borehole, the resonant properties of the transmitter and its driving system under different load conditions contribute to production of signals of different predominant frequencies. It is also possible that the attenuation of such signals in travel from the transmitter to the adjacent borehole walls and thence through the formations to the receiver undergo frequency selective modification. Such a system moved along the length of a borehole and past formations highly contrasting in character one with another would produce modifications in the frequency spectrum of the received pulse that may be correlated with the lithology.

In the copending application of Gerald C. Summers, a coworker of applicants, Serial No. 493,944, filed March 14, 1955, for "Acoustic Pulse Frequency Log," there has been disclosed and claimed a method by means of which there may be registered on a space scale related to the depth of a plurality of points in a borehole magnitudes of conditions each proportional to the frequency of the oscillating sound fields detected at the spaced points in the borehole and resulting from the generation of a succession of time-separated sound fields. The present invention is concerned with improvements in respect to the systems and also as to certain method aspects, the latter involving the manner in which systems similar to those illustrated in the accompanying drawing may be caused to operate in a similar manner.

A system is provided which is particularly adapted to be used in conjunction with production of a succession of sound fields separated in time one from another and each characterized by having an abrupt onset of sound oscillations. At each of a plurality of points in a borehole extending through the earth formations at least one of the sound fields is detected. The present system obtains a measurement of the time interval in each of the sound fields corresponding with a predetermined number of acoustic oscillations thereof beginning with the abrupt onset. The magnitude of the time intervals is then registered on a space scale related to the depth of the detecting point. Variations in frequency of the detected sound fields when plotted on a depth scale indicate contrasting formation characteristics. The method involved may be carried out and the time interval may be measured by several different systems involving the generation of a condition which changes in magnitude in a known manner beginning in response to the detection of the abrupt onset of each sound field.

In a more specific aspect, a unidirectional voltage is produced which is proportional in magnitude to the combined periods of the first three complete particle excursions within the received acoustic impulses. The invention includes a receiving channel which includes means for converting the received impulses into square waves and for differentiating such square waves to produce unidirectional impulses corresponding with predetermined phase occurrences of the received impulse. A counter system responsive to the unidirectional impulses is employed to produce an output pulse at the end of a predetermined number of such impulses.

The means for generating a function, monotonic in character, is actuated upon receipt of the first of such unidirectional impulses. A measuring system samples the function coincident with and in response to the last of such impulses to actuate a memory system in proportion thereto for measurement. A recorder having a chart driven in proportion to the depth of the acoustic system in one dimension plots variations in the monotonic function in a second dimension to produce a log inversely proportional to the acoustic pulse frequency.

For a further understanding of the present invention and for a more complete description thereof, reference may now be had to the following description taken in conjunction with the accompanying drawings in which:

Fig. 1 is a schematic diagram of the present invention; and

Fig. 2 includes a plot of voltages generated in the system of Fig. 1.

The system shown in Fig. 1 includes an exploring unit 10 having a transmitter 11 at the lower end thereof and a receiver 12 near the upper end thereof. The unit 10 is supported as by cable means 13 which may include a first channel 14 connected to a pulse power source 15 for transmitter 11. A second channel 16 connects the receiver 12 to a measuring system 20. Pulse power applied from source 15 to transmitter 11 repeatedly energizes transmitter 11 to produce sharp, time-spaced acoustic pulses.

Acoustic energy from transmitter 11 travels to receiver 12 by way of the adjacent formations as well as through the fluid in the borehole. However, since formations generally have a higher acoustic velocity than fluids, the acoustic energy first reaching receiver 12 will have traveled through the formations and thus may be treated to yield data singularly dependent upon acoustic properties of the formations.

In graph A, Fig. 2, the received energy has been illustrated as comprising a rather complex train of waves which represents the sum of the waves traveling by all paths from the transmitter 11 to the receiver 12. A timing marker or initial pulse 21 is applied to channel 16 coincident with the generation of the acoustic pulse by transmitter 11. Thus pulse 21 may be employed for control purposes as will hereafter be explained.

The principal interest in connection with the present invention centers upon the first few cycles of the received pulse 22 such as appear in the dotted circle B and which are represented in a magnified form in graph B of Fig. 2. The received energy, graph B, builds up to fairly large oscillations with reference to a zero axis 23. Depending upon the manner of connecting the receiver 12 to the measuring circuit 20, the first excursion from the zero axis may be positive or negative and has been shown as a negative excursion 24 followed by succeeding cycles of greater amplitude and of frequency which depends upon the loading of the transmitter 11 by the borehole fluids and the adjacent formations, the character of the excitation and of the attenuating properties intermediate transmitter 11 and receiver 12. It has been found that the frequency of such signals is determined at least in part by the character of the formations. This invention therefore relates to a measurement proportional to the average frequency of the first few cycles of the received pulse 22. In the system shown in Fig. 1 the time interval 26 equal to the sum of the periods of the first three excursions of wave 22 is measured.

The signal 22 from the receiver 12 is applied by way of channel 16 to an amplifier and clipper 30 which applies at its output a square wave of the type illustrated by graph C. Amplifier 30 may be of a type well known by those skilled in the art in which high amplification produces steep slopes at or adjacent the zero axis. The resultant signals, when clipped, have square wave configuration. The square waves of form C are then applied to a unit 36 which includes a differentiating means and a full-wave rectifier. The output of unit 36 is then transmitted by way of condenser 29 to a signal gate which includes two diodes 31 and 32. More particularly, the condenser 29 is connected to the juncture between the cathode of diode 31 and the anode of diode 32 by way of a resistor 33. The juncture is also connected by way of condenser 34a and resistor 34 to the input terminal 34b of a binary counting system. Diode 32 is connected to ground by way of a resistor 32a. The anode of diode 31 is connected by way of resistor 37 to the positive terminal of a suitable B+ supply which, for the purpose of illustration, has been shown as a battery 38.

The anode of tube 31 is connected by way of condenser 31a to the anode of a triode 41. The cathode of tube 32 is connected by way of condenser 32c to the cathode of tube 41. Tube 41 is a control triode connected at its anode by way of resistor 42 to the B+ terminal of battery 38. The cathode of tube 41 is connected through resistor 41a to ground. The grid of tube 41 is biased by battery 43 connected between grid and ground, the bias being such as normally to block tube 41. It should be noted that resistances 41a and 42 preferably are of equal value. When this is the case and with tube 41 blocked, the voltages on the anode of tube 31 and on the cathode of tube 32 permit conduction through diodes 31 and 32 from battery 38 to ground. The large current thus flowing is such as to prevent the signal from unit 36 from producing any appreciable voltage changes across the output impedance 35 of the gate unit.

When tube 41 is permitted to conduct, the anode thereof is less positive than when cut off and the cathode is more positive. The circuit is designed so that the changes in voltages at the anode and plate of tube 41 are sufficient to alter the conduction characteristics of the diodes 31 and 32. When this is the case, diodes 31 and 32 may be cut off when tube 41 conducts to permit the sharp voltage spikes shown at E, Fig. 2, to appear across the output resistor 35. The latter voltage pulses are produced by differentiation and full-wave rectification in unit 36. The elements of unit 36 may be of conventional design well known to those skilled in the art to apply through condenser 29 the negative voltage spikes or pulses, each of which occurs in time coincident with the passage through the zero axis 23, Fig. 2, of the waveform of graph C. Such negative pulses have been shown in graph E and are applied by way of condenser 48 and resistors 49 and 50 to the anodes of a first decade counter unit 51. Since the construction and operation of binary counters are well known, the circuit will not be described in detail. Briefly, however, the grid of the first triode stage 52 is connected by way of impedance 53 to ground and the grid of the second triode, stage 54, is connected by way of impedance 55 to the output terminal 56 of a reset unit. The anode of the first tube 52 is connected by way of condensers 57 and 58 to the control grids of the second counter stage 60. Counter 60 is identical with counter 51, being connected at its input grid through impedance 61 to ground and the grid of the output stage to terminal 56 by way of impedance 62. The anode of the input stage is connected by way of conductor 63 to the input terminal 64 of the reset unit and by way of conductor 65 to the input terminal 66 of a gated monostable multivibrator 67. A second input 68 of multivibrator 67 is connected to channel 16 by way of conductor 69 and the output of multivibrator 67 is connected by way of conductor 69a to the input grid of the gate control tube 41.

The system thus far described operates in the following manner. At an instant corresponding with the beginning of the received pulse of graph B (at time 70) the voltage on channel 16 triggers monostable multivibrator 67 from its stable state to its unstable state to raise the voltage on the grid of tube 41, permitting it to conduct thereby abruptly cutting diodes 31 and 32 off. This action permits signals to pass through the gate circuit which includes tubes 31 and 32. The signal of graph B also is applied to amplifier 30 where it is squared and clipped to form at the output thereof a waveform as shown in graph C. The latter waveform is applied to unit 36. Unit 36 differentiates and full-wave rectifies the applied signal to produce the negative spikes shown in graph E. The latter signal is then passed through the gate to the binary counters.

The first pulse 71 of graph E turns off the tube 52 which is normally conducting and fires tube 54. The second pulse 72 turns off tube 54 and re-establishes conduction in tube 52. At the same time a negative pulse is produced at the anode of the tube 52 which is applied by way of condenser 58 to the grid of the second tube of counter 60 to initiate conduction and extinguish the first tube of counter 60. A third pulse 73 extinguishes tube 52 and initiates conduction in tube 54. A fourth pulse 74 extinguishes tube 54 initiating conduction in tube 52 and causes a negative pulse to be applied from the plate of tube 52 through the condenser 57 to the grid of the first stage of counter 60. This turns off the second stage of counter 60, producing a positive pulse at the anode of the second stage and a negative pulse at the anode of the first stage. The latter pulse is applied to the reset counter by way of conductor 63 to re-establish conduction in the first stages of counters 51 and 60 and also is applied by way of conductor 65 to the monostable multivibrator 67 abruptly to return the latter to its stable state. This action causes tube 41 to cut off and re-establishes conduction through tubes 31 and 32, thus preventing further transmission through the diode gate. The portions of the waveform B which occur following pulse 74 are then blocked and do not pass to the counter system.

It should be noted, however, that the output of gate tubes 31 and 32 is coupled by way of conductor 82 to the control terminal 83 of a function generator 84. The first pulse 71 of graph E serves to initiate action in function generator 84. Preferably a function is produced in unit 84 which linearly increases in magnitude as a function of time following pulse 71. For the purpose of illustration it will be assumed that function generator 84 is of the type described and claimed in Patent No. 2,704,364, which issued March 15, 1955, upon co-pending application Serial No. 192,750, filed October 28, 1950, of Gerald C. Summers, a co-worker of applicants, wherein a voltage of the form shown in graph F is produced and comprises a linearly increasing voltage which from a predetermined level at the instant of pulse 71 increases linearly over a time interval much greater than the time interval occupied by the selected number of cycles of the received pulse. The output of function generator 84 is coupled to a double triode clamp 90 connected in series with a capacitive element 90a. The double triode clamp is characterized by the anode of the first being connected to the cathode of the second section and the cathode of the first section connected to the anode of the second section. A battery 91 connected in the grid cathode circuit of the first stage maintains the first stage normally cut off. A battery 92 in the grid cathode circuit of the second stage maintains the second stage normally cut off. Transformer windings 93 and 94 in the grid cathode circuits of the first and second stages, respectively, are coupled by magnetic linkages represented by the dotted lines 95 and 96 to a blocking oscillator 81.

At an instant corresponding with pulse 74 a positive pulse appears at the anode of the second stage of counter 60 which is applied by way of conductor 80 to the blocking oscillator 81. A resultant pulse produced in a magnetic core in blocking oscillator 81 common to the windings 93 and 94 serves to momentarily permit conduction through the double triode clamp at the instant corresponding with pulse 74, graph E, to permit flow of an electrical charge between function generator 84 and condenser 90a. The action is such as to charge condenser 90a to a voltage equal to the magnitude of the function 85 at an instant corresponding with the occurrence of pulse 74. The latter voltage in graph F is represented by the symbol G. Thus the voltage G is directly proportional to the time interval 26, graph B. The voltage across condenser 90a is recorded on recorder 90b. The chart of the recorder is driven by a mechanical coupling 90c from pulley 90d which is in contact with cable 13.

The system may be operated by moving the exploring unit 10 over the length of a well bore and repeating the series of operations above described at each of a plurality of depths to open the double triode clamp 90 in response to each received pulse and thereby adjust the charge on condenser 90a so that the latter charge is always directly proportional to the time interval of the selected number of excursions of the received pulse 22 from its zero axis.

It will be apparent that any selected number of excursions of the received pulse may be employed for measurement in accordance with the present invention. Three excursions (or four zero crossings) have been here employed for the purpose of illustration.

In general it will be preferred in the design of the system to limit the time following the generation of each acoustic pulse in which the measurements are made in order to avoid the measurements influenced by energy passing through the borehole fluids. The time interval required for energy to reach the receiver via the borehole fluids may be computed by taking the ratio of the velocity of sound in the fluid to the distance between transmitter 11 and receiver 12.

It should further be understood that the function generator 84 may take forms other than those characterized by the generation of a linearly increasing voltage. For example, the system for generating a train of high frequency pulses such as disclosed in co-pending application Serial No. 370,376 of Robert A. Broding et al., co-workers of applicants, is suitable. As there disclosed, the limits of the time interval to be measured are defined by pulses 71, 74, graph E (the control pulses on conductors 82 and 80).

The foregoing description has assumed the idealized conditions insofar as noise is concerned. More particularly as shown in graph A, Fig. 2, the receiver channel 16 is free from any noise in the interval between the generation of each acoustic pulse by transmitter 11 corresponding with pulse 21 and the reception by receiver 12 of pulse 22. In practice it may be found that noise energy will set the system of Fig. 1 into operation to count the first few cycles of the noise energy. Such erroneous measurements may be avoided by employing the noise sensing system described and claimed in co-pending application Serial No. 482,993, filed January 20, 1955, now U.S. Patent 2,857,011, issued October 21, 1958, of Gerald C. Summers, a co-worker of applicants, wherein a noise responsive unit 99 permits transmission of signals to the measuring circuit 20 only when noise in the interval between pulse 21 and received pulse 22 is below a certain predetermined level.

In carrying out the present invention a series of acoustic impulses identical in character is produced to create a succession of sound fields in the formations adjacent a borehole. At each of a plurality of points spaced along the borehole the sound fields are sampled. In response to the onset of each sound field at a given point in the borehole there is initiated the production of a condition which changes in magnitude in a known manner as a function of time. The magnitude of the condition is then measured at the instant corresponding with the end of a predetermined number of acoustic oscillations of the sound field. The magnitude of the condition as each such instant is then registered in relation to the depth of each of the corresponding detecting points in the borehole.

Ordinarily it will be preferred to produce the sound field through the use of an acoustic transmitter which is always maintained a predetermined distance from the receiver thereby permitting variations in loading of the transmitter by the formations to find expression in the frequency content of the detected sound field. However, the coupling of the formations to the receiver itself may be made the primary variable by placing the sound source far from the points of reception. For example, charges of dynamite may be detonated at or near the mouth of the borehole with a receiver successively positioned at great depths in the borehole. Upon reception of the resultant signal at such depths, the time required for a given number of acoustic oscillations may be measured.

Consistent with the primary object of the present invention to obtain a measurable parameter which is dependent upon the earth formations, it is highly desirable that energy traveling from the transmitter 11, Fig. 1, to receiver 12 through the borehole fluids does not materially influence the measurements. The velocity of sound through the formations in general is higher than the velocity of sound through the borehole fluids and thus discrimination on the time basis may be effective to prevent unwanted interference. The generation of control pulses such as pulses 71—74 will therefore be limited to the time interval following the generation of each acoustic pulse by transmitter 11 equal to the spacing between transmitter 11 and receiver 12 divided by the velocity of sound in the borehole fluids.

From the foregoing description it will be seen that the function 85, Fig. 2, is a linearly increasing voltage function. Similarly, the train of pulses generated in accordance with the above noted application Serial No. 370,376 is a linearly increasing function. Both such functions may be identified under a general designation as monotonic functions, that is functions which do not change sign of slope in a given time interval.

The foregoing description has related to the generation of control pulses 71—74 each of which is coincident with the zero incidence of an oscillation of the output from receiver 12. Alternatively, the frequency characteristics of the received signal may be logged by generating control pulses corresponding in time with the peaks and troughs of the received signal. Such peaks and troughs as well as the zero incidences for the purpose of the present description may be considered as transition points. Transition points of one character occur at the zero incidences where there is a transition from a positive to a negative voltage. Transition points of another character occur at peaks and troughs of the received signal where there is a transition from positive slope to negative slope or from negative slope to positive slope. By providing a suitable differentiating network prior to the clipping and full-wave rectification of the received signal, the control pulses may be produced corresponding with such transitions in slope.

While the invention has been described in connection with certain specific embodiments thereof, it will now be understood that further modifications will suggest themselves to those skilled in the art and it is intended to cover such modifications as fall within the scope of the appended claims.

What is claimed is:

1. In a well logging system in which an oscillatory acoustic field is produced in fluids in a borehole and a signal generated in response to said oscillatory acoustic field is transmitted to the earth's surface the combination which comprises means for producing a pulse corresponding in time with each transition point of given character in said signal, a pulse counting system, a monotonic function generator, means for simultaneously energizing both said counter system and said generator coincident with and in response to the first of said pulses, and means responsive to the output of said counter system for measuring the magnitude of said function in response to the last of a predetermined number of said pulses thereby to produce a measurement of the average frequency of said oscillatory sound field.

2. In a well logging system in which an oscillatory acoustic field is produced in fluids in a borehole and a signal generated in response to said oscillatory acoustic field is transmitted to the earth's surface the combination which comprises means for producing a control pulse corresponding in time with the zero incidence of each oscillation of said signal, a pulse counting system, a monotonic function generator, means for simultaneously energizing both said counter system and said generator coincident with and in response to the first of said pulses, and means responsive to the output of said counter system for measuring the magnitude of said function in response to the last of a predetermined sequence of said pulses thereby to produce a measurement proportional to the frequency of said oscillatory sound field.

3. In acoustic well logging where an acoustic field having an abrupt onset is repeatedly produced in a borehole the combination which comprises a receiver for generating a succession of electrical signals each of which corresponds with one of said sound fields at a selected location in a well bore, means connected to said receiver for producing a pulse corresponding in time with each transition point of given character in said electrical signals, a pulse counting system, a monotonic function generator, means connected to said receiver and adapted to energize said generator in coincidence with the first pulse of each sound field, and means connected to the output of said counting system and to said function generator for measuring the monotonic function at an instant coincident with the last of a predetermined number of said pulses from each of said sound fields thereby to produce a measurement of the average frequency of said sound field.

4. In acoustic well logging where an acoustic field having an abrupt onset is repeatedly produced in a borehole the combination which comprises a receiver for generating a succession of electrical signals each of which corresponds with one of said sound fields at a selected location in a well bore, means connected to said receiver for producing a pulse corresponding in time with the zero incidence of each oscillation in said electrical signals, a pulse counting system, a monotonic function generator, means connected to said receiver and adapted to energize said generator in coincidence with the first pulse of each sound field, and means connected to the output of said counting system and to said function generator for measuring the monotonic function at an instant coincident with the last of a predetermined number of said pulses from each of said sound fields thereby to produce a measurement of the average frequency of said sound field.

5. A well logging system comprising an acoustic transmitter and an acoustic receiver spaced a predetermined distance along a well bore and supported for movement along the length of said well bore, means for periodically energizing said transmitter to produce a succession of acoustic fields in said borehole each of which has an abrupt onset and is oscillatory in character, a signal channel connected to said receiver for transmitting to the earth's surface electrical signals corresponding to said acoustic fields detected by said receiver, means for producing a pulse corresponding in time with each transition point of a given character in each of said electrical signals, a pulse counting system, a monotonic function generator, means connected between said channel and said function generator for energizing said function generator in response to the first pulse of each of said acoustic fields, and means responsive to the output of said counting system and said monotonic generator for establishing a condition dependent in magnitude upon the magnitude of the monotonic function at a time corresponding with the last of a predetermined number of said transition points to produce a measurement of the average frequency of said acoustic field.

6. The combination set forth in claim 5 in which means are provided for limiting counting of said predetermined number of transition points to a time interval beginning with each said onset and less than the distance between said transmitter and said receiver divided by the velocity of sound in the borehole fluids.

7. In combination with a transmitter of acoustic pulses and a receiver supported in a spaced relation for movement along the length of a well bore the combination therewith which comprises a signal channel connected to said receiver and including a differentiator and full-wave rectifier for producing a sharp pulse corresponding in time with each zero incidence of the signals from said receiver, a signal gate connected to said differentiator and full-wave rectifier, means for generating a monotonic function, means for energizing said gate and said generating means coincident with the first of each of said pulses, and means connected between said gate and said generator and including a measuring means for measuring the magnitude of said function in response to the last of a predetermined number of said pulses.

8. In combination with a transmitter of acoustic pulses and a receiver supported in a spaced relation for movement along the length of a well bore the combination therewith which comprises a signal channel connected to said receiver and including a differentiator and full-wave rectifier for producing a sharp pulse corresponding in time with each zero incidence of the signals from said receiver, a signal gate connected to said differentiator and full-wave rectifier, means for generating a monotonic function, means for energizing said gate and said generating means coincident with the first of each of said pulses, and measuring means including a pulse counter connected between said gate and said generator for measuring the magnitude of said function in response to the last of a predetermined number of said pulses.

9. In combination with a transmitter of acoustic pulses and a receiver supported in a spaced relation for movement along the length of a well bore the combination therewith which comprises a signal channel connected to said receiver and including a differentiator and full-wave rectifier for producing a control pulse corresponding in time with each zero incidence of the signals from said receiver, a signal gate connected to said differentiator and full-wave rectifier, means for generating a voltage which varies linearly as a function of time from a predetermined initial value, means for energizing said gate and said generating means coincident with the first control pulse following each of said acoustic pulses, and measuring means including a pulse counter connected between said gate and said generating means for measuring the magnitude of said voltage at an instant coincident with the last of a predetermined number of control pulses following each of said acoustic pulses.

10. An acoustic well logging system which comprises means for generating a succession of time-separated sound fields each having an abrupt onset in formations penetrated by a well bore, a receiver adapted to be positioned at each of a plurality of points spaced along said well bore to detect at least one of said sound fields at each of said points, a system connected to said receiver for generating a condition proportional in magnitude to the time interval corresponding with a predetermined number of oscillations in each sound field beginning with each abrupt onset at said receiver, and means for registering the magnitude of each said condition at a point along a space scale related to the depth of the corresponding point in said well bore.

11. An acoustic well logging system which comprises means for generating a sound field at each of a plurality of points along a well bore, each sound field characterized by an abrupt onset of oscillations, a receiver adapted to be poistioned a predetermined distance along said well bore from each of said points for detecting at least one of the sound fields at each position of said receiver, a system connected to said receiver responsive to each said abrupt onset at said receiver for generating a condition proportional in magnitude to the time interval corresponding with a predetermined number of said oscillations immediately following each abrupt onset at said receiver, and means for registering each said condition along a space scale related to the depth of said points in said well bore.

12. The method of logging earth formations penetrated by a borehole which comprises producing a succession of time-separated sound fields each having an abrupt onset, at each of a plurality of points in a borerole penetrating said earth formations detecting the sound field, generating a condition proportional in magnitude to the time interval in each sound field corresponding with the sum of the periods of a predetermined number of acoustic oscillations thereof and registering the magnitude of each said condition along a space scale related to the depth of said points in said borehole.

13. The method of logging earth formations penetrated by a borehole which comprises producing at a first point in a borehole sharp acoustic impulses, at a second point spaced a predetermined distance from said first point detecting said acoustic pulses, generating a condition proportional in magnitude to the time interval occupied by a predetermined number of half cycles of the detected pulses, and registering said condition in relation to the depth of said points in said borehole.

References Cited in the file of this patent
UNITED STATES PATENTS

| | | |
|---|---|---|
| 2,599,586 | Ross | June 10, 1952 |
| 2,651,027 | Vogel | Sept. 1, 1953 |
| 2,704,364 | Summers | Mar. 15, 1955 |
| 2,754,056 | Friedman | July 10, 1956 |